United States Patent
Gaudreault

(10) Patent No.: US 6,802,176 B2
(45) Date of Patent: Oct. 12, 2004

(54) CUTTER HEAD ASSEMBLY

(76) Inventor: Guy Gaudreault, 398 Route 138, Forestville, Québec (CA), G0T 1E0

( * ) Notice: Subject to any disclaimer, the term of this patent is extended or adjusted under 35 U.S.C. 154(b) by 208 days.

(21) Appl. No.: 09/920,882

(22) Filed: Aug. 2, 2001

(65) Prior Publication Data

US 2002/0017091 A1 Feb. 14, 2002

(30) Foreign Application Priority Data

Aug. 2, 2000 (CA) .............................. 2316471

(51) Int. Cl.$^7$ ............................... A01D 34/00
(52) U.S. Cl. ................... 56/294; 56/504; 56/DIG. 12; 144/34.1
(58) Field of Search ................ 56/500, 504, 249, 56/252, 156, DIG. 17, DIG. 20; 37/301, 302; 144/4.1, 34.1, 334, 335, 336; 241/193, 194

(56) References Cited

U.S. PATENT DOCUMENTS

| | | | | |
|---|---|---|---|---|
| 3,844,096 A | * | 10/1974 | Dunn | ........................ 56/504 |
| 4,259,834 A | * | 4/1981 | Lambert et al. | ............... 37/91 |
| 4,973,005 A | * | 11/1990 | Haesebrouck et al. | ...... 241/194 |
| 5,392,999 A | * | 2/1995 | Konig et al. | ................. 241/194 |
| 5,511,597 A | | 4/1996 | Shantie et al. | |
| 5,642,765 A | | 7/1997 | Brown | |
| 5,848,627 A | * | 12/1998 | Brown | ........................ 144/241 |
| 6,000,205 A | | 12/1999 | Joray | |
| 6,042,035 A | * | 3/2000 | Grobler et al. | ............. 241/191 |
| 6,321,518 B1 | * | 11/2001 | O'Hagan | ................... 144/34.1 |

FOREIGN PATENT DOCUMENTS

| | | | | |
|---|---|---|---|---|
| DE | 3741267 A1 | * | 6/1988 | |
| EP | 0951815 | | 10/1999 | .......... A01D/34/52 |
| GB | 2307630 | | 6/1997 | .......... A01D/50/02 |

* cited by examiner

Primary Examiner—Thomas B. Will
Assistant Examiner—Nathan Mammen
(74) Attorney, Agent, or Firm—Darby & Darby

(57) ABSTRACT

A cutter head assembly comprising a first longitudinal member; a second hollow longitudinal member provided with at least one aperture, being coaxial with the first longitudinal member and radially spaced apart therefrom; cup-shaped elements fixedly mounted to a corresponding aperture and to the first longitudinal member; blade holders to removably secure a rotatable blade to the cutter head. These blade holders are designed so as to improve mulching action and resistance to impacts of the cutter head, for use in land clearing and in any operation involving mechanical vegetation cutting.

18 Claims, 3 Drawing Sheets

CUTTER HEAD ASSEMBLY

FIELD OF THE INVENTION

The present invention generally relates to land clearing and to any operation involving mechanical vegetation cutting. More specifically, the present invention is concerned with a cutter head assembly for such operations.

BACKGROUND OF THE INVENTION

Felling and mulching operations are conventionally performed using a removable cutter head fixed on a self-propelled vehicle that is either wheeled or tracked, for example. There are two types of equipment known in the art and readily available on the market for felling and mulching operations: vertical shaft cutter heads, usually mounted to the side of the vehicle, and horizontal shaft cutter heads, usually mounted to the front of the vehicle.

Vertical shaft cutter heads are generally similar to lawn mowers and will not be further discussed herein.

Horizontal shaft cutter heads are generally made of a horizontal rotor around which blades are attached by means of blade retaining devices. This rotor is typically driven in rotation by a hydraulic motor. The blade retaining devices are commonly made from long rods on which the blades are aligned out, side by side on the same row, or following a spiral design.

The cutter heads mentioned hereinabove have several drawbacks. More specifically, changing a single worn out blade can be complex and time-consuming. It often results in the user changing all the blades of a same row at once, no matter if they require being replaced or not, in order to avoid repeating the process within a short period of time and so as to prevent decreased cutting efficiency.

Moreover, the mechanical resistance of the above mentioned cutter heads to repeated impacts is limited because the rotor is generally made of a single hollow tube. Also, since the width of the rotor rarely exceeds 1.5 meters, the resulting cutting surface is insufficient for works on large terrains. This type of rotors is generally designed for domestic use more than for industrial applications.

In addition, the method of attachment of the cutter blades presented in the prior art does not satisfactorily meet the requirements of both simplicity and resistance to impacts. More precisely, the relatively wide interspaces provided between adjacent cutter blades, while enhancing the overall cutting surface of the device, may cause chips of wood or other foreign matters such as steel fence, roots, wire and the like, to be caught in these interspaces, which may reduce the efficiency of the cutter in use. Also, when performing cutting operation, such a design may result in projections of wood chips harmful to people standing around.

Efforts have been made in order to solve the above problems. In particular, the flail cutter described by Dallman, in his European Patent no. 0,951,815 issued in 1999, has a coaxial structure that comprises a rotation shaft inserted into a pair of hollow tubes. However, while permitting an easy set up of the cutter blade holding devices, this structure is not designed to sustain great impacts.

The prior art was also concerned with improving the shape of the cutter blade holders. Bachmans, in his patent GB 2,307,630 issued in 1997, describes an assembly comprising a hollow tube provided with apertures that receive cup-shaped elements welded by their bottom base to said tube. The walls of these elements extend beyond the diameter of the tube to form the cutter blade holders.

In spite of previous improvements, the mechanical resistance to impact of such assemblies is still often insufficient, and the design of the blade holders is not optimized in order to grant smooth unobstructed flow of the chipped wood and hence efficiency of the cutter head.

There is therefore a need for a cutter head that would be powerful, tough and safe enough to allow industrial work.

OBJECTS OF THE INVENTION

An object of the present invention is therefore to provide an improved cutter head assembly.

SUMMARY OF THE INVENTION

More specifically, in accordance with the present invention, there is provided a cutter head assembly comprising:

a first longitudinal member;

a second hollow longitudinal member provided with at least one aperture, said second longitudinal member being coaxial with said first longitudinal member and radially spaced apart therefrom;

at least one cup-shaped element comprising four sidewalls, each said at least one cup-shaped element being fixedly mounted to both a corresponding one of said at least one aperture and said first longitudinal member; and at least one cutter blade mounted in said at least one cup-shaped element.

According to another aspect of the present invention, there is provided a blade holder to removably secure a cutting blade into a generally longitudinal cutter head provided with a plurality of apertures separated by interspaces; said blade holder comprising:

a fin-shaped top surface;

a bottom surface to be mounted to said cutter head; and lateral surfaces that are configured to receive a cutting blade;

wherein said blade holder has a longitudinal width that completely fills the interspace between two consecutive apertures of said cutter head.

Other objects, advantages and features of the present invention will become more apparent upon reading of the following nonrestrictive description of preferred embodiments thereof, given by way of example only with reference to the accompanying drawings.

DESCRIPTION OF THE PREFERRED EMBODIMENT

In a nutshell, the present invention is generally concerned with a horizontal cutter head assembly comprising coaxial inner and outer tubes and cutter blade holders so configured as to increase cutter efficiency and wear life of the cutter head assembly.

Figure 1:
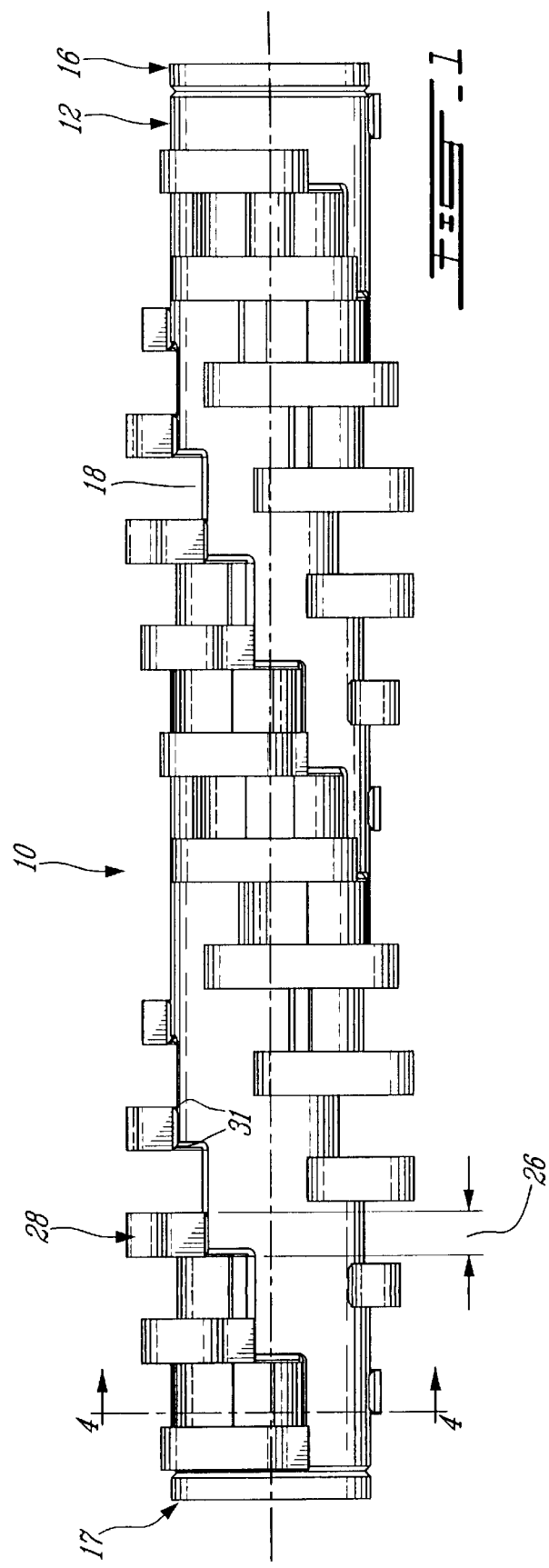
FIG. 1 is a top view of a cutting head assembly according to an embodiment of the present invention.
Figure 2:
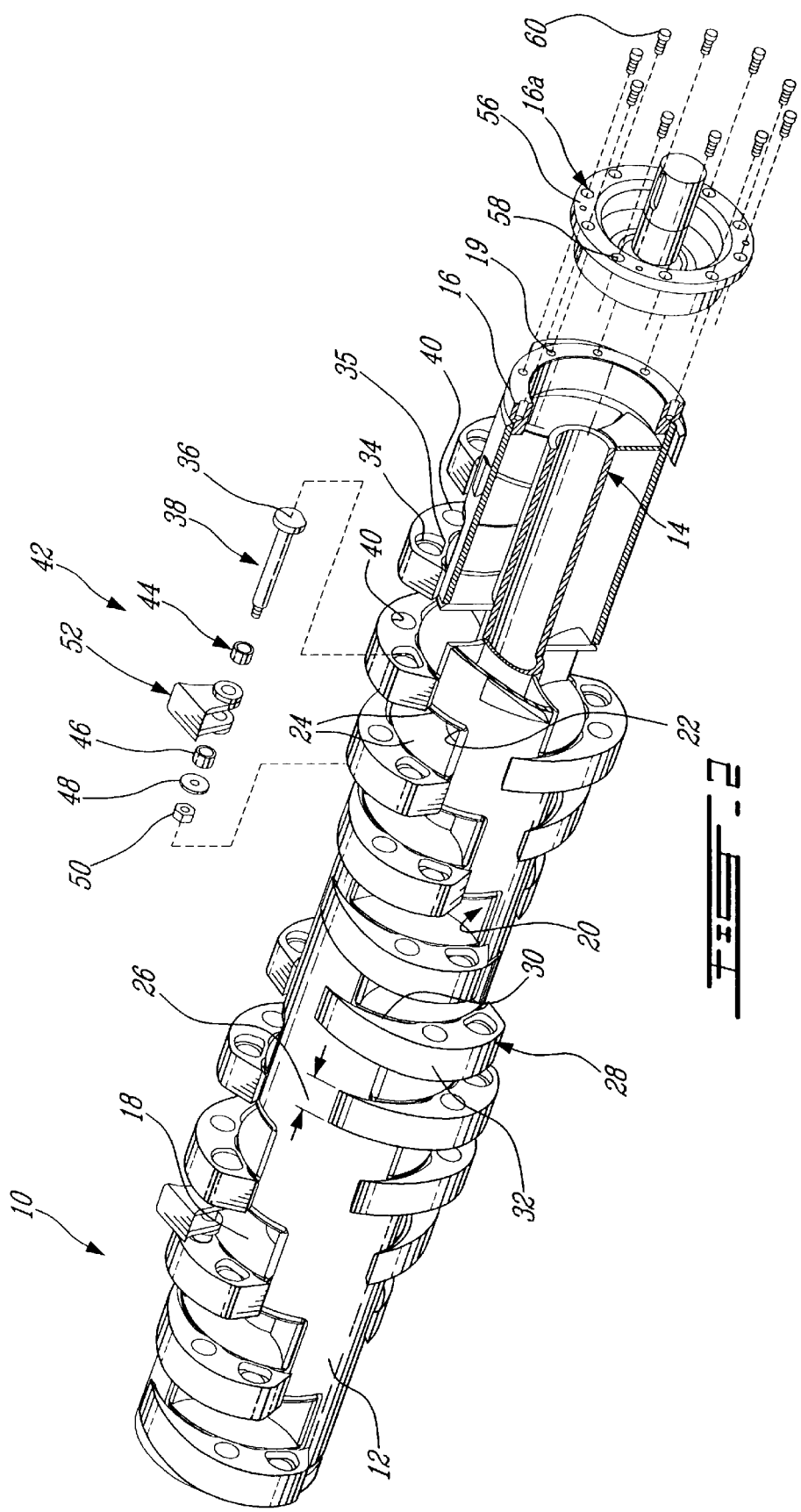
FIG. 2 is a part-sectional and part-exploded tri-dimensional view of the cutting head assembly of FIG. 1.

Turning now more specifically to FIGS. 1 and 2 of the appended drawings, the structure of a cutter head assembly 10 according to an embodiment of the present invention will be described.

The cutter head assembly 10 comprises an outer tube 12 and an inner longitudinal member shown in our example as an inner hollow tube 14, coaxially mounted inside the outer tube 12 and radially spaced apart from it. Two end caps 16 and 17 are provided at opposite longitudinal ends of the tubes 12 and 14 and are secured to both tubes 12 and 14. These end caps 16 and 17 include threaded apertures 19.

It should be noted that the assembly of the present invention does not display any central shaft. Instead, the driving shaft of the assembly comprises two lateral mounting elements 16a (only one shown in FIG. 2) each mounted to a corresponding end cap 16 and 17 as will be described hereinbelow.

The outer tube 12 is provided with rectangular-shaped apertures 18 circumferentially located in spiral patterns around the outer tube 12. Each of these apertures 18 is so designed as to receive a respective cup-shaped element 20.

Each cup-shaped element 20 includes two curved side-walls 22 and two flat side-walls 24. These side-walls 22 and 24 are advantageously secured to one another, via welding for example, before being mounted to the tubes 12 and 14.

Figure 4:
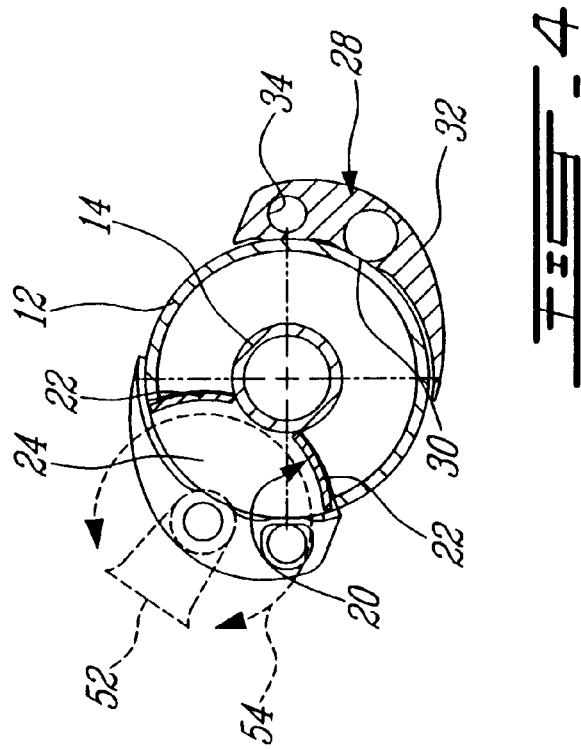
FIG. 4 is a cross sectional view taken along line 4—4 of FIG. 1.

As can be better seen from FIG. 4 of the appended drawings, the cup shape elements 20 do not include a bottom wall, but the lower portions of the side-walls 22 and 24 are secured to the inner tube 14 via welding, for example. Similarly, the upper portion of the side-walls 22 and 24 are secured to the outer tube 12 via welding.

As will be apparent to one skilled in the art, by welding the cub shape elements to both the outer and inner tubes 12 and 14, a stronger cutter head assembly is produced.

Figure 3:
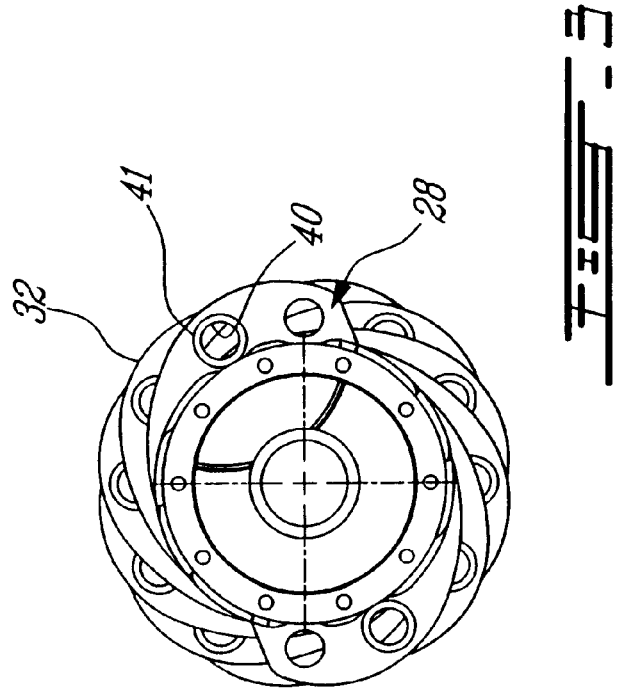
FIG. 3 is an end view of the cutter head assembly of FIG. 1.

In the interspaces 26 between consecutive apertures 18 of the outer tube 12 are mounted cutter blade holders 28. These cutter blade holders 28 are therefore located according to a spiral pattern circumferentially around the tube 12 (as can be best seen on FIG. 3).

The holders 28 are independent and integral elements, comprising a concave base 30 that fits the shape of the outer tube 12 and a top convex surface 32 that protrudes outward beyond the diameter of the tube 12. This protruding surface 32 is generally fin-shaped.

Moreover the cutter blade holders 28 are so longitudinally sized in width that once in place they completely fill the interspaces 26 between consecutive apertures 18 on the tube 12 (see FIG. 1).

The concave base 30 of the blade holders 28 include beveled surfaces 31, as can be better seen from FIG. 1, allowing a better welding of the holders 28 to the outer tube 12.

The side of the blade holders 28 includes a first rounded aperture 34 provided with a D-shaped shoulder 35 on a first lateral surface of the blade holder 28, configured and sized to receive the D-shaped head 36 of a threaded fastener 38. The blade holder 28 also includes a second rounded aperture 40 provided with a round shoulder 41 on a second surface of the blade holder 28, the purpose of which will be described hereinbelow.

As can be better seen from FIG. 2, the aperture 40 of one blade holder 28 is aligned with the aperture 34 of an adjacent blade holder 28.

The blade holding assembly 42 includes the fastener 38, a pair of bushings 44 and 46, a washer 48 and a nut 50, all used to secure a rotating cutter blade 52 between adjacent blade holders 28, hence inside the cup-shape element.

The bushings 44 and 46, made of ultra-resistant steel, are advantageously inserted in a press-fit manner inside the apertures 34 and 40 of blade holders 28 so as to protect the blade holders 28 from wear caused by abrasion and vibrations while facilitating blade replacement. In such a fashion, only the bushings wear out and need be replaced. This feature increases the wear life of the cutter blade holders 28 and improves the efficiency of the cutter head assembly 10 since the blades 52 are not stopped in their rotation movements by wear on blade holders 28. Every blade 52 is mounted individually and easily replaceable. Indeed, once the bushings 44 and 46 are respectively inserted in the apertures 34 and 40, the blade 52 may be positioned between adjacent blade holders 28, the fastener may be inserted in the apertures 34 and 40 through apertures of the blade 52. The washer 48 in then inserted in the shoulder 41 and the nut is mounted to the fastener 38.

As will easily be understood by one skilled in the art, the configuration and position of the apertures 34 and 40 allow each blade 52 to be installed and removed independently.

It is to be noted that, as can be seen from FIG. 1, the shoulders 35 and 41 are sufficiently deep that neither the head 36 of the fastener 38 or the nut 50 protrudes from the lateral surfaces of the holder 28.

As can be seen from the dashed line arrow 54 of FIG. 4, the blade 52 can freely rotate and swing back inside the cup-shaped elements 18 whenever an obstacle is hit by the blade 52.

As mentioned hereinabove, the different parts and elements are advantageously fixedly mounted together by welding. Thus the two radially curved sides 22 and two longitudinal side-walls 24 of the cup-shaped element 20 are welded together and to the inner and outer tubes 12 and 14; and the concave base 30 of the cutter blade holders 28 are fixedly mounted to the outer tube 12 by welding in the interspaces 26 between consecutive rectangular apertures 18.

Each one of the two lateral mounting elements 16a is mounted to a corresponding end cap 16 or 17 by means of a substantially annular end plate 56 provided with apertures 58 corresponding to the threaded apertures 19 of the end caps. Fasteners 60 are used to removably mount the lateral mounting element 16a to the end cap. Hence these mounting elements 16a are very easily removed and replaced in case of damage or deformation, with a minimum waste of time.

The fin-shaped cutter blade holders 28 are designed so that obstacles such as a chip of wood or other foreign matter will gently slide on them instead of impairing the movement of the cutter head 10 or inducing damage to the assembly. Moreover, since they are affixed to the tube 12 in the interspaces 26 between apertures 18 containing the cup-shaped elements 20, the cutter blade holders 28 contribute to an improved mulching action of the cutter head 10 and permit an unobstructed flow of matter since a full width of wooden object cannot be stuck in the interspaces 26 comprised between the apertures 18 in tube 12.

As a way of example, the overall assembly can have a width of 2.3 meters and be installed directly at the front of a vehicle. The cutter head assembly 10 is advantageously made of resistant material, advantageously ultra-resistant steel, to achieve the mechanical solidity and resistance required for the work to be performed.

It will be noted that the presence of the member 14 coaxially located inside the outer tube 12 and spaced apart from it, provides for additional inertia to the assembly. It is also to be noted that even though the member 14 is shown as a cylindrical hollow tube, this is not a limitation of the present invention since a solid tube, having a circular cross-section or not, could be used.

Although the present invention has been described hereinabove by way of preferred embodiments thereof, it can be modified, without departing from the spirit and nature of the subject invention as defined in the appended claims.

What is claimed is:

1. A cutter head assembly comprising:
    a first longitudinal member;
    a second hollow longitudinal member provided with at least one aperture, said second longitudinal member being coaxial with said first longitudinal member and radially spaced apart therefrom;
    at least one cup-shaped element comprising four side-walls, each said at least one cup-shaped element being fixedly mounted to both a corresponding one of said at least one aperture and said first longitudinal member; and
    at least one cutter blade mounted in said at least one cup-shaped element by means of a blade holder having a substantially fin-shaped top surface;
    wherein said blade holder has a longitudinal width that completely fills the interspace between one of said at least one aperture of said second hollow longitudinal member and an adjacent at least one aperture of said second hollow longitudinal tube.

2. A cutter head assembly comprising:
    a first longitudinal member;
    a second hollow longitudinal member provided with at least one aperture, said second longitudinal member being coaxial with said first longitudinal member and radially spaced apart therefrom;
    at least one cup-shaped element comprising four side-walls, each said at least one cup-shaped element being fixedly mounted to both a corresponding one of said at least one aperture and said first longitudinal member; and
    at least one cutter blade mounted in said at least one cup-shaped element by means of a blade holder having a substantially surface;
    wherein cutting blade is mounted between two blade holders so as to freely rotate in one of said at least one cup-shaped element.

3. The cutter head assembly according to claim 2, wherein said first longitudinal member is generally tubular.

4. The cutter head assembly according to claim 3, wherein said tubular first longitudinal member has a round cross section.

5. The cutter head assembly according to claim 2, wherein said second longitudinal member has a substantially round cross section.

6. The cutter head assembly according to claim 2, wherein said at least one aperture provided on said second longitudinal member is rectangular-shaped.

7. The cutter head assembly according to claim 2, wherein said at least one cup-shaped element comprises two radially curved side-walls and two flat side-walls.

8. The cutter head assembly according to claim 7, wherein said two radially curved side-walls and two flat side-walls of said at least one cup-shaped element are welded together.

9. The cutter head assembly according to claim 7, wherein each side wall of said at least one cup-shaped element includes a lower portion that is secured to said first longitudinal member by welding and an upper portion that is secured to said second longitudinal member by welding.

10. The cutter head assembly according to claim 2, wherein said blade includes lateral surfaces provided with means for independently and removably mounting one of said at least one cutter blade thereto.

11. The cutter head assembly according to claim 2, wherein said blade holder has a bottom surface configured and sized to be mounted to said second hollow longitudinal member.

12. The cutter head assembly according to claim 2, further including two lateral mounting members fixedly mounted to opposite longitudinal ends of said assembly.

13. The cutter head assembly according to claim 12, further including two end caps fixedly mounted to opposite longitudinal ends of said assembly; each said two lateral mounting members including an annular end plate configured to be removably mounted to a corresponding one of said two lateral mounting members.

14. The cutter head assembly according to claim 2, wherein said first and second longitudinal members are made of ultra-resistant steel.

15. The cutter head assembly according to claim 2, wherein said blade holder comprises:
    a fin-shaped top surface;
    a bottom surface to be mounted to the cutter head; and
    lateral surfaces that are configured to receive one of said at least one cutter blade;
    and said blade holder has a longitudinal width that completely fills an interspace between two consecutive apertures of said cutter head.

16. The cutter head assembly according to claim 15, wherein said lateral surfaces includes first and second lateral surfaces; said first lateral surface including a first aperture provided with a shoulder and said second lateral surface including a second aperture provided with a shoulder, wherein, when two said blade holders are mounted to the cutter head on opposite sides of one of the plurality of apertures of the cutter head, said first aperture of one of the two blade holders is aligned to said second aperture of the other of the two blade holders.

17. The cutter head assembly according to claim 16, wherein said shoulders are so configured and sized that a fastener used to secure a cutting blade between consecutive blade holders does not protrude from the lateral surfaces of said blade holder.

18. The cutter head assembly according to claim 15, wherein said blade holder is made of ultra-resistant steel.

* * * * *